United States Patent
Smits (10) Patent No.: US 8,269,772 B1
(45) Date of Patent: Sep. 18, 2012

(54) SYSTEM, APPARATUS, AND METHOD FOR GENERATING IMAGES OF LAYERED SURFACES IN PRODUCTION OF ANIMATED FEATURES

(75) Inventor: Brian Smits, Corvallis, OR (US)

(73) Assignee: Pixar, Emeryville, CA (US)

( * ) Notice: Subject to any disclaimer, the term of this patent is extended or adjusted under 35 U.S.C. 154(b) by 698 days.

(21) Appl. No.: 12/352,506

(22) Filed: Jan. 12, 2009

Related U.S. Application Data (60) Provisional application No. 61/051,813, filed on May 9, 2008.

(51) Int. Cl.
*G06T 15/50* (2011.01)
*G09G 5/02* (2006.01)

(52) U.S. Cl. ........................ 345/426; 345/589

(58) Field of Classification Search .................. 345/429, 345/589
See application file for complete search history.

(56) References Cited

U.S. PATENT DOCUMENTS

| | | |
|---|---|---|
| 2003/0169272 A1* | 9/2003 | Nagano ................. 345/582 |
| 2006/0209067 A1* | 9/2006 | Pellacini et al. ........... 345/426 |
| 2009/0021513 A1* | 1/2009 | Joshi et al. .................. 345/419 |

OTHER PUBLICATIONS

Strauss, Paul S.; "A Realistic Lighting Model for Computer Animators"; *IEEE Computer Graphics and Applications Archive*, vol. 10, No. 6, 9 pages.

* cited by examiner

*Primary Examiner* — Jeffrey Chow
(74) *Attorney, Agent, or Firm* — Kilpatrick Townsend & Stockton LLP; Philip H. Albert (57) ABSTRACT

A system, apparatus, and method for rendering images as part of the production of animated features by generating an image of a surface or set of surfaces by modeling the reflection of light from the surface or set of surfaces. The invention may be used to provide a visually appealing and sufficiently realistic image of a surface or set of surfaces for use in production scale rendering, while requiring fewer computational resources than typically required by a strict physical model.

21 Claims, 4 Drawing Sheets

Figure 1

PRIOR ART

SYSTEM, APPARATUS, AND METHOD FOR GENERATING IMAGES OF LAYERED SURFACES IN PRODUCTION OF ANIMATED FEATURES

CROSS-REFERENCE TO RELATED APPLICATION

This application claims priority to U.S. Provisional Patent Application 61/051,813, entitled "Reflection Model For Production Rendering Of Animated Features", filed May 9, 2008, the entirety of which is hereby incorporated by reference.

BACKGROUND

The present invention is directed to computer graphics, and more specifically, to a system, apparatus, and method of generating an image of a surface composed of multiple layers by modeling the reflection of light from those layers, and which may be used in the production of animated features.

The production of animated features involves the use of computer graphics techniques to produce a visually appealing image that can be used to convey an element of a story. One of the challenges in rendering images for use in animated features is balancing the desire for a visually appealing image of a character or object with the practical issues involved in allocating the computational resources required to produce the image in a feature film environment. Further, although the image need not be fully realistic in all cases, it is desirable that the artist producing the image be able to modify certain attributes of the rendered image, typically by adjusting input parameters of the graphics software, to obtain a visually appealing image that suits the purposes of the story line.

In a typical image rendering process, an element in the scene or image is modeled and then the software models how that element appears to a viewer at a specified location and viewing angle when one or more light sources illuminate(s) the element. This usually also involves modeling how light reflects and scatters from the element and how the reflected or scattered light is viewed. In this regard, most rendering algorithms or methods contain a process for determining the appearance of a point or region of a surface as viewed from a given location (typically defined by a position and viewing angle). This process typically contains two primary stages. First, determining how light will interact with the surface at the region or point on the surface of interest (i.e., computing the values for a reflection model of the region or point), and second, evaluating the reflection model for each light source in the scene, followed by multiplying the result by the light's intensity.

As discussed, one aspect of the image rendering process is that of modeling the reflection of light from a surface or group of layered surfaces. The reflection model (R) at a point x on a surface is a function of the view direction (v) and the light direction (u), and a set of parameters (P) that characterize the surface or region of interest. These parameters may determine the shape or distribution of a function or functions representing the reflection of light from the surface, and may represent for example, the roughness or other characteristics of the surface. In a typical situation, the shape of the function or functions determines the color of the surface and how matte or shiny the surface will appear. For example, there may be one function or distribution of reflected light for each wavelength or wavelength band of interest. The combination of the functions or distributions determines the overall visual appearance and color of the surface. The shape determining parameters (P) may be determined at each point on the surface by evaluating texture maps or executing shaders (software routines that produce values for certain characteristics of a surface as an output). The resulting appearance of the surface as illuminated by a set of lights, each with direction u(l) and intensity L(l), can be expressed in a general form as:

$$\text{Appearance} = \text{Sum(over } l \text{) in Lights}(L(l)R(P(x,v),v,u(l))).$$

In some circumstances, the appearance of a surface is the result of light interacting with multiple material layers (e.g. dust on top of rust on top of copper). In this situation, each layer (m) of the material results in a set of reflection model parameters, $P_m$, for that layer, where such parameters may include how much that layer is contributing to the result at that point on the surface. In this case, the appearance of the surface at a point x can be expressed as:

$$\text{Appearance} = \text{Sum}(m) \text{ in Layers(Sum } l \text{ in Lights}(L(l)R(P_m(x,v),v,u(l)))).$$

Although an accurate representation of the appearance, evaluating this expression can become unreasonably costly in terms of computational resources as the number of light sources and material layers increases.

In practice, some production environment solutions have kept all of the layers separate and accepted the computational and resource costs of evaluating all of the lights for each of the layers. However, in order to conserve or better allocate computational resources, another approach has been to build a representation of multiple materials by using a single layer to represent the effects of multiple layers. Unfortunately, one disadvantage of this approach is that such a model may become unduly complicated and is often visually inconsistent or otherwise undesirable to an animator or viewer.

As understood by the inventor, modeling the reflection of light sources from a surface or set of surfaces is not addressed by the computer graphics research community in a way that is suitable for production environment rendering for at least two reasons. Firstly, reflection models tend to be based on classes of functions that do not linearly combine (i.e., $R(P_1+P_2) \neq R(P_1)+R(P_2)$). Therefore, it is generally not possible to add the parameters from two separate layers in a way that gives the same response as evaluating the two layers independently. Secondly, when a layer only partially covers the layer underneath it, or is transparent (e.g. a varnish coating on wood), allowing the light to pass through it, the light that strikes the underneath layer may have its intensity and direction changed in a way that significantly impacts the resulting appearance. The result is that in general, a very computationally expensive simulation must be performed (and one that can differ significantly depending upon the types of layers involved) in order to get the physically "correct" answer for the reflection problem when modeling the reflection of light from multiple layers.

As a result, determining a general solution to the problem of production scale rendering of the image of a layered surface has largely been ignored. For some special situations, such as layers of paint pigment, closed form expressions have been derived. However these models are often both computationally expensive and limited to a narrow set of materials. Hence these models are of limited value for general use in film production, as they are generally not applicable to different types of surfaces than those for which they are originally derived.

Given the resource constraints involved in production scale rendering of images, it may not be possible to derive a general solution that is "correct" in the sense of being based on an accurate physical model. However, in production rendering the "right" solution is not determined by the precision of the physical model, but instead by a visual image that is "acceptable to the director". Since the final appearance defines "correct", it is more important that the inputs to a rendering process can be modified to achieve a desired look within the constraints posed by the production environment.

What is desired is a method, and associated system and apparatus for implementing the method, that can be used to generate an image of a surface or set of surfaces by modeling the reflection of light from that surface or surfaces, and that is suitable for use in the rendering of images in the production of animated features.

BRIEF SUMMARY

The present invention is directed to systems, apparatus, and methods for rendering images as part of the production of animated features, and specifically, to generating an image of a surface or set of surfaces by modeling the reflection of light from the surface or set of surfaces. The invention may be used to provide a visually appealing and sufficiently realistic image of a surface or set of surfaces for use in production scale rendering, while requiring fewer computational resources than typically required by a strict physical model.

In some embodiments, the present invention is directed to a method of rendering an image of a surface composed of a plurality of layers, where the method includes determining a set of appearance parameters for each layer of the plurality of layers, converting each set of appearance parameters into a set of reflection parameters, thereby producing a set of reflection parameters for each of the plurality of layers, combining the set of reflection parameters for each of the plurality of layers to produce a set of reflection parameters for the surface; and evaluating the set of reflection parameters for the surface for each of a plurality of light sources, thereby generating the image.

In another embodiment, the present invention is directed to an apparatus for generating an image of a surface composed of a plurality of layers, where the apparatus includes a processor configured to execute a set of instructions, a memory coupled to the processor for storing the set of instructions, and the set of instructions stored in the memory, wherein when executed by the processor the instructions implement a method to determine a set of appearance parameters for each layer of the plurality of layers, convert each set of appearance parameters into a set of reflection parameters, thereby producing a set of reflection parameters for each of the plurality of layers, combine the set of reflection parameters for each of the plurality of layers to produce a set of reflection parameters for the surface, and evaluate the set of reflection parameters for the surface for each of a plurality of light sources, thereby generating the image.

In yet another embodiment, the present invention is directed to a computer program product, where the computer program product includes a computer readable medium encoded with a set of instructions, which when executed by a processor implement a method to generate an image of a surface composed of a plurality of layers, the method including determining a set of appearance parameters for each layer of the plurality of layers, converting each set of appearance parameters into a set of reflection parameters, thereby producing a set of reflection parameters for each of the plurality of layers, combining the set of reflection parameters for each of the plurality of layers to produce a set of reflection parameters for the surface, and evaluating the set of reflection parameters for the surface for each of a plurality of light sources, thereby generating the image.

Other objects and advantages of the present invention will be apparent to one of ordinary skill in the art upon review of the detailed description of the present invention and the included figures.

DETAILED DESCRIPTION OF AN EMBODIMENT OF THE INVENTION

Figure 1:
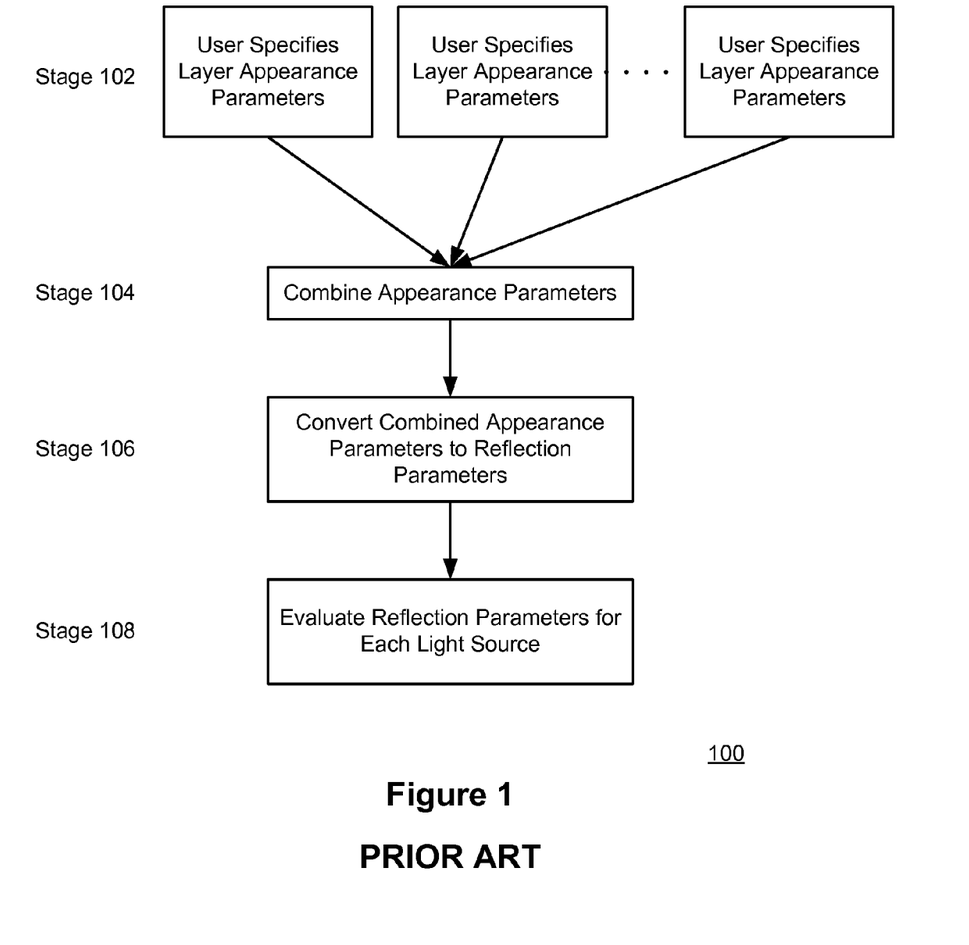
FIG. 1 is a functional representation illustrating a first method for modeling the reflection of light from a surface or structure comprised of multiple layers as part of rendering an image during production of an animated feature.

FIG. 1 is a functional representation illustrating a first method 100 for modeling the reflection of light from a surface or structure comprised of multiple layers as part of rendering an image during production of an animated feature. As shown in the figure, the final image is the result of modeling the reflection of a plurality of light sources from a surface or structure comprised of multiple layers. In a typical use case, a user would specify appearance parameters for each layer (stage 102). Such appearance parameters might include color, roughness, or other surface characteristics. Next, the appearance parameters for each separate layer are combined to produce a set of appearance parameters that represent the parameters for the set or group of layers (stage 104). In the rendering environment, and for purposes of this application, this "combining" step refers to a process or technique for transforming or converting multiple sets of parameters (e.g., each of the set of surface appearance parameters for multiple layers or surfaces) into a single set of parameters that can be taken to represent the multiple sets of parameters (e.g., in this example, the composite or final surface composed of the multiple layers or surfaces). Next, at stage 106, the combined appearance parameters produced at stage 104 are converted to a single set of reflection parameters which characterize how those appearance parameters determine the light reflection characteristics of the composite surface, which as noted, is composed of multiple layers. Then, at stage 108, the reflection parameters for the composite surface are evaluated for each light source of interest in the image. This determines the image produced by the light sources interacting with the composite surface.

Although the method described with reference to FIG. 1 can be used to render the image of a set of layered surfaces, it does have certain disadvantages. This method, sometimes termed the "combine early" approach is computationally efficient, but often either visually unappealing or very limited in its utility. One reason for this limited value is that the combining process is a linear operation, and the parameters that are being combined early often have very non-linear effects on the resulting image. In many cases, the diffuse reflection contributions of the surfaces can be combined in a visually appealing way using this approach, but the specular reflection contributions cannot be. This results in a situation where it is very difficult for users (such as artists) to work with independent surface layers when trying to render an image of light reflecting from multiple surface layers, which has the result of greatly increasing the cost of creating the image.

Figure 2:
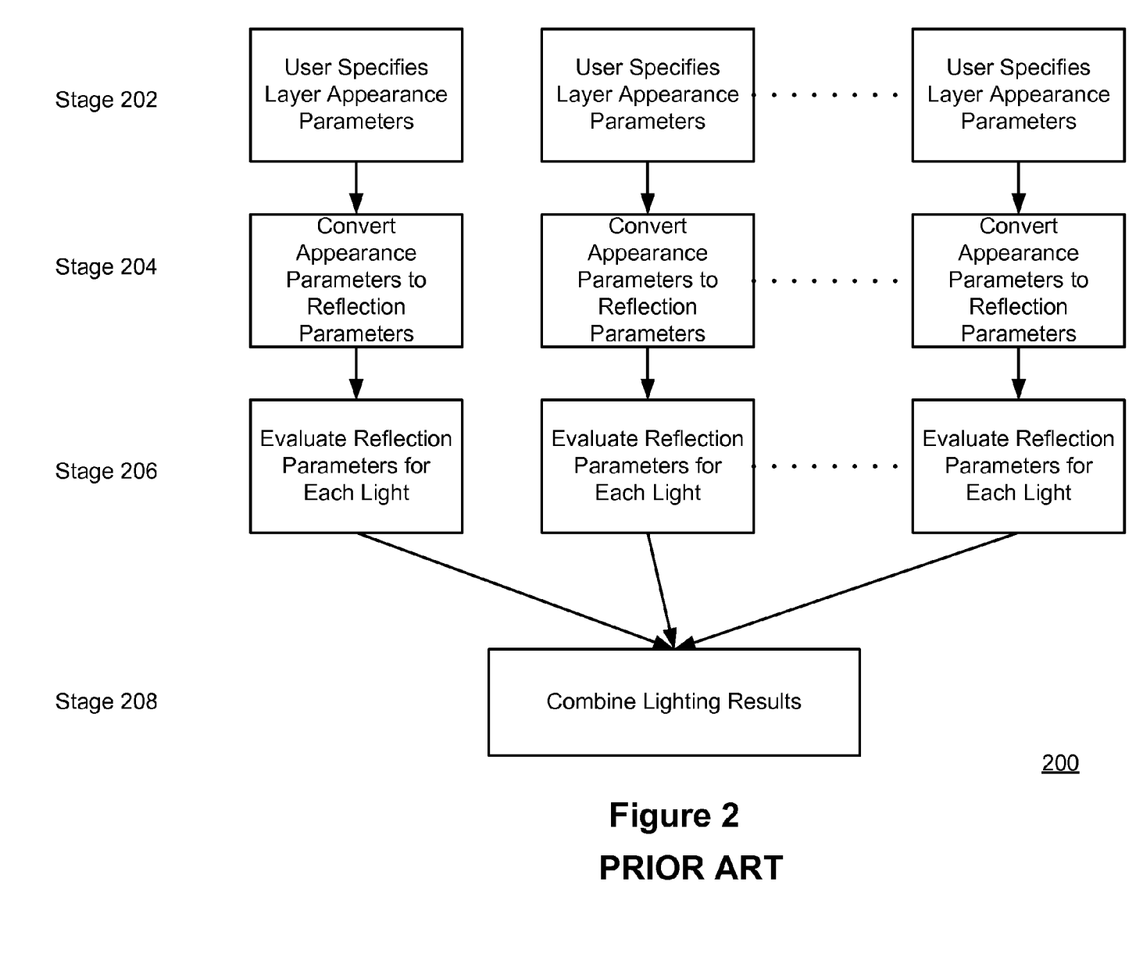
FIG. 2 is a functional representation illustrating a second method for modeling the reflection of light from a surface or structure comprised of multiple layers as part of rendering an image during production of an animated feature.

FIG. 2 is a functional representation illustrating a second method 200 for modeling the reflection of light from a surface or structure comprised of multiple layers as part of rendering an image during production of an animated feature. As shown in the figure, the final image is the result of modeling the reflection of a plurality of light sources from a surface or structure comprised of multiple layers. In a typical use case, a user would specify appearance parameters for each layer (stage 202). Such appearance parameters might include color, roughness, or other surface characteristics. Next, for each layer, the appearance parameters would be converted to reflection parameters (stage 204) which characterize how those appearance parameters determine the light reflection characteristics for each layer. After that, and again for each layer, the reflection parameters are evaluated for each light source of interest in the image (stage 206). Then, at stage 208, the results of evaluating the light sources for each layer are combined to produce the final image.

The approach described with reference to FIG. 2 is sometimes termed the "combine late" approach and is in some sense a technically accurate approach as it evaluates every light source for every layer. However, since the computational resources required to render an image typically scale with the number of light/surface evaluations, this results in render times that increase significantly with each additional layer. In addition, some relighting tools require a fixed amount of data to define the appearance of the surface. As indicated, in the combine late approach of FIG. 2, the amount of data needed to describe the surface is dependent upon the number of layers. This makes the relighting tool less accurate, and in some relighting tools this approach results in lower performance.

Figure 3:
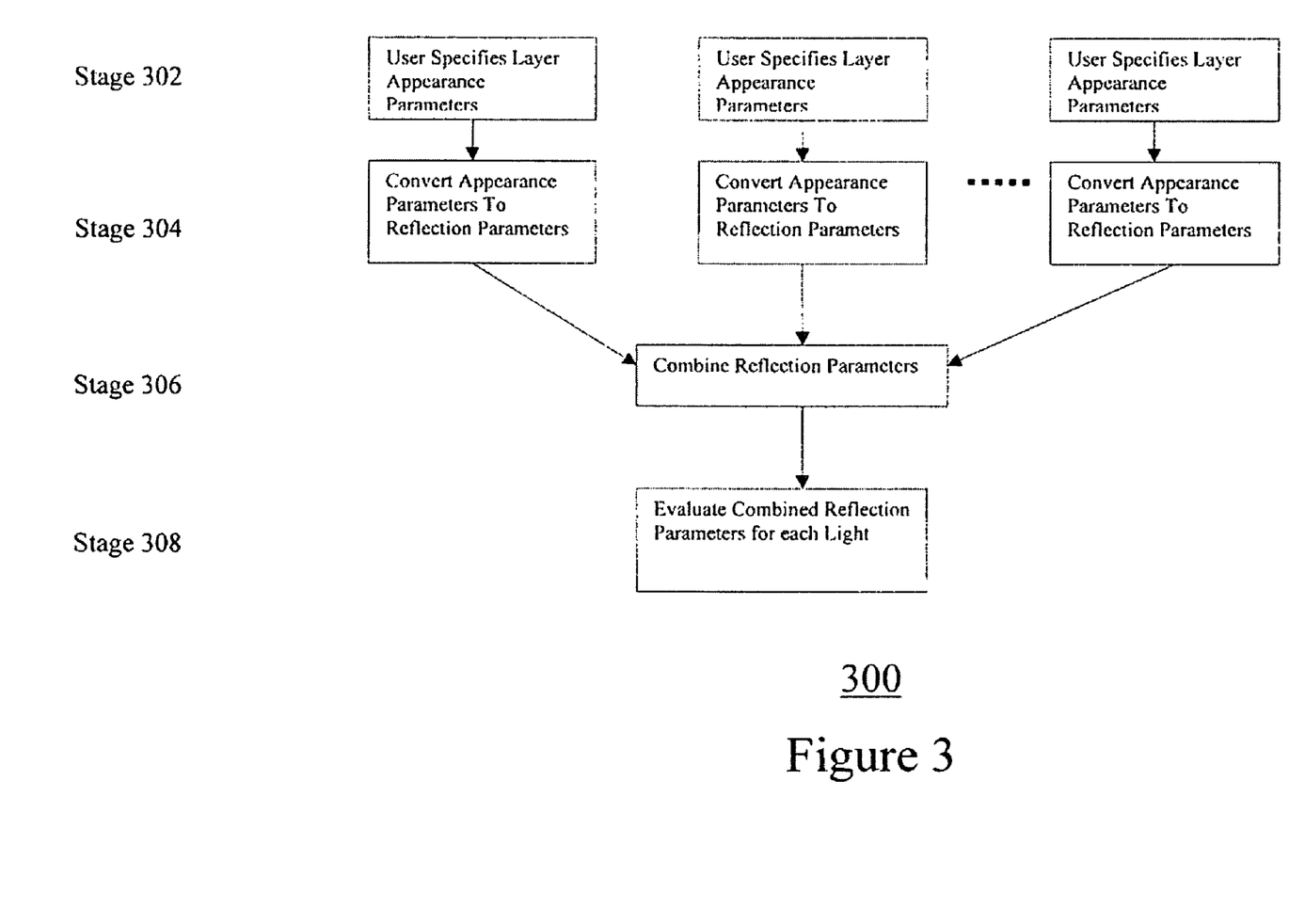
FIG. 3 is a functional representation illustrating a method for modeling the reflection of light from a surface or structure comprised of multiple layers as part of rendering an image during production of an animated feature, in accordance with some embodiments of the present invention.

In contrast to the methods or approaches described with reference to FIGS. 1 and 2, the inventive approach to be described with reference to FIG. 3 provides the accuracy and flexibility of the combine late approach (so that the technical artists can achieve the appearance they desire quickly), along with many of the performance benefits of the combine early approach.

The following is a more detailed description of the primary steps or stages of the invention. It is understood that the description is exemplary and that other methods, processes, etc. may be utilized and fall within the concept of the invention.

FIG. 3 is a functional representation illustrating a method 300 for modeling the reflection of light from a surface or structure comprised of multiple layers as part of rendering an image during production of an animated feature, in accordance with some embodiments of the present invention. In some embodiments, the inventive approach may be described as one directed to performing a combining operation before lighting in order to maintain computational efficiency, but in a manner that is close enough to linear to provide plausible and predictable results for the user. This has the effect of producing satisfactory appearing images in a more optimal manner with regards to the use of computational and data storage resources. As noted, in some sense the inventive approach provides the accuracy and flexibility of the combine late approach to enable the technical artists to achieve the image appearance they desire quickly, while retaining many of the performance advantages of the composite early approach.

One benefit of the present invention is that it provides a flexible reflection model suitable for production scale animated features films that is also efficient and suitable for view dependent baking. Here, view dependent baking means folding the portion of the appearance that is determined by the view direction into the parameters describing the surface. The resulting image can then be rendered using those parameters and the light direction. In some embodiments, this approach requires combining the reflection models from multiple layers (e.g. dirt/rust/metal) of a surface into a single reflection model. Although it may be easier to author and manage material descriptions where each layer of the material is worked on separately and then combined, as noted that approach incurs significant computational expense and is generally not desirable As shown in FIG. 3, in some embodiments, the inventive method, process or approach begins by a user (such as an artist) specifying appearance parameters for each layer (stage 302). Although there are many surface characteristics or parameters that may be used, the table below shows an example of surface parameters (color, roughness, and metallic) that may be used to specify the appearance characteristics of a surface or layer. Note that in this example, the appearance parameter "color" refers to the relative contributions of the three color components (red, green, blue) to the surface color. The color of a surface as perceived by a viewer depends upon both the surface color (as well as other appearance parameters) and the light illuminating the surface.

| Material | Color | Roughness | Metallic |
| --- | --- | --- | --- |
| Paper | (.9, .9, .9) | .85 | 0 |
| Chrome | (1, 1, 1) | 0 | 1 |
| Smooth Blue Plastic | (.2, .2, .8) | .15 | 0 |

The above parameters are only exemplary and represent one possible set of user controls over the inputs to the inventive model. As shown, in this embodiment, the surface parameters used are {Color, Roughness, Metallic}. In this example, a color consists of three values (red, green, and blue) all having values between 0 and 1. These values represent the relative contribution of each of the color components to the overall surface color. Roughness is a parameter that goes from completely smooth or polished at a value of 0 to very rough and matte-looking at a value of 1. The metallic parameter has a value of 0 for non-metals (plastic, wood, paper) and a value of 1 for metals (copper, chrome, silver), and can be set to intermediate values to achieve a desired artistic effect. The user may also be provided with additional, secondary parameters to help adjust the resulting appearance. As will be discussed in greater detail, in some embodiments, these parameters can be used to define the diffuse, specular, and reflection components for this layer of the surface or structure. In addition, each layer may contain a weight that determines the amount of that layer present at each point on the surface and hence the contribution of that layer to the overall reflected or scattered light. In some embodiments, a surface may also be transparent, in which case additional parameters {TransmissionAmount, TransmissionScatter} may be used to determine the transmitted diffuse, transmitted specular, and reflection components of the overall reflection model.

Returning to FIG. 3, at stage 304, the appearance parameters for each layer are converted to reflection parameters that characterize how light would be reflected from a surface having the specified appearance parameters. In some embodiments, the appearance parameters for a layer or surface are used to determine the parameters for the reflection components of the surface. For example, a large roughness parameter will result in a surface with a higher diffuse component and lower reflection component than would a small roughness parameter. More generally, in some embodiments, the reflection parameters may include ranges of values that make visual sense to a viewer (e.g., a range of zero to one, zero to infinity, or an angle in the range of zero to 90 degrees). At the endpoints of these ranges the surface takes on well defined visual qualities. For example, a surface with zero specular contribution and reflection looks matte. A surface with zero diffuse contribution and specular looks mirror-like. The middle values of the parameter ranges tend to have more subjective qualities. The conversion process takes the visually descriptive appearance parameters (e.g., roughness, metallic, reflection strength, etc) and maps them onto the reflection model parameter ranges, typically by mapping the endpoint values of the appearance parameters to the end point values of the reflection model. Then, a smooth curve is used to provide a transition between the endpoints, with the shape of the curve being based on visual feedback from users.

In some embodiments of the invention, the appearance parameters are converted to a set of reflection parameters based on viewing angle. The conversion may be done based on a set of empirically determined blending functions. Where applicable, the roughness parameter may be used to determine the shape parameters for the diffuse, specular, and reflection components of the reflection model. The roughness, metallic, color and view direction are then combined to produce the weights on the diffuse, specular and reflection components. The functions that are used in the combining operation are intended to capture the general physical properties of materials (or at least to some degree those that are primarily responsible for how a surface or material appears). That is, the functions attempt to capture the empirical behavior observed by users.

As an example, at a roughness value of zero (0) a user typically desires a very smooth polished surface with crisp reflections, and at roughness value of one (1) the user desires a very rough, matte surface with little or no reflections or specular component. Further, in between those values, the user desires that the surface have highlights, but for those highlights to be weaker and broader. For non-metals the reflections and highlights are desired to be relatively weak and not affected by the color of the surface. For metals the reflections and highlights are desired to be much stronger and take on the color of the material. When the view direction grazes the surface (i.e., a view approximately perpendicular to surface normal) a user would expect to see less diffuse and more specular and reflection. It is also desirable that the transitions between these boundary behaviors be visually smooth. As discussed, artists and other users of the inventive system or method may adjust various input parameters until the resulting image has a desired visual appearance. This is useful as one purpose of the inventive model is to give the user a tool that can be used to quickly preview the effect of changes to the input parameters on the resulting image.

At stage 306, the reflection parameters for each layer or surface are combined to produce a single set of reflection parameters that characterize the reflection properties of the combination of layers or surfaces. In this regard, the single set of reflection parameters may be said to characterize the reflection properties of the structure or surface composed of the multiple layers. In some embodiments, the view dependent reflection parameters are combined so that the resulting set of parameters represents a convincing visual blend of the input layers.

There are typically two types of parameters that are processed. The first determines the weighting of the contribution (the amount of light) coming from each component. The reflection model is a linear combination of the components with these weights. Because of this, these weights can be blended based on the weight of each layer. The second type of parameter maybe used to determine the shape of the components.

Thus, if applicable, there may be parameters associated with the specular and reflection components that determine the shape of those components. In general, the inventive reflection model is not linear with respect to these components, and a broad specular component combined with a narrow specular component is not accurately (in a visual sense) represented by a single specular component.

As noted, one purpose of the inventive model is to produce a result that is visually satisfactory. There are two main criteria for doing this. First, the shape parameters should be represented in a form that is roughly visually linear. This is a subjective concept, with one meaning being that if a set of parameters are half way between those for a smooth surface with sharp highlights and a rougher surface with broader, softer highlights, then the result should look like it is roughly half way between sharp highlights and softer highlights.

Although artists will adjust the transitions until things look as desired, by making the parameters roughly visually linear, their job is made easier and more intuitive. Note that rather than storing exponents to describe the specular and reflection components, in some embodiments, the model stores the sine (sin) of an angle that represents the spread of these components. These parameters (the sine values) blend in a way that has been found to be visually pleasing. The second criteria is that if a layer has very low weight for a specular or reflection component due to other appearance parameters, then it is desirable that the layer not dominate the shape of the specular or reflection component. This can be achieved by weighting the shape parameters by the relative lighting weights for the components from each layer, rather than simply by the layer weights (i.e., weight the shape parameters by the weight values for the magnitude of the contributions to the overall visual appearance).

Next, at stage 308, the set of combined reflection parameters for the surface or layers are evaluated for each light source of interest in a scene. Given the parameters for the diffuse, specular, and reflection components of the overall reflection process, the invention determines how each light source will contribute to the final appearance of the surface. This is done by evaluating each light to determine intensity and direction, and then evaluating the reflection model components based on the light direction to get a color weight, followed by multiplying by the light intensity. The resulting contributions from each light are then summed together to obtain the final expected image.

This set of operations may be expressed by the summation over all lights equation described above. In pseudo-code the set of operations would be:

```
surfaceColor = (0, 0, 0) // Black
For each light l {
    Determine lightDirection and intensity (as a color) lightColor
    color refWeight = ReflectionModel(Params,
    lightDirection, viewDirection)
    surfaceColor = refWeight * lightColor
```

For some applications, the inventive reflection model may be described in terms of the following primary operations:
(a) Take the appearance parameters for each layer or surface as user inputs and perform the computations that are not functions of light direction or intensity. The result is a set of parameters that describe a function that takes a light direction and intensity and returns the amount of light reflected off the surface (i.e., the reflection parameters);
(b) Combine these parameters based on both the weight (presence or lack thereof) of each layer and the amount of energy in each reflection model component for each layer; and
(c) For each light source of interest in a scene, compute the light intensity and direction. Evaluate the reflection model using the combined parameters for each light source. Perform standard accumulation of the results to obtain the final result.

The inventive rendering system, apparatus, process or method provides greater compatibility between the image produced from "preview lighting" techniques and the actual end result obtained during production. This provides an improvement in ease of use as it results in a closer relationship between the preview image and the final output image. Further, the inventive approach is designed to retain an approximately linear relationship between the input parameters and the output image—this provides an ease of use for the artist and assists in producing the final rendered image in a computationally efficient manner.

The preceding description of an embodiment of the inventive system and method for modeling the reflection of light from a surface or surfaces may be implemented using various mathematical models or representations of the contribution of the different visual components to the resulting image. Examples of such implementations or models will now be described, although it is understood that such models are only representative of those that may be used to practice the invention, and that other models are suitable and may be utilized.

As a first exemplary model, a model having two terms, a diffuse term and a highlight term will be described. In this example, the highlights will always be white (i.e., the surface color will affect the diffuse component but not the highlight component). Let (u) be a unit vector in the direction of the light, let (v) be a unit vector in the direction of the eye, and let (n) be the unit length surface normal at the point whose appearance is being determined (i.e., being shaded). In this example, a user will specify appearance parameters, roughness (r) and color (C) for the surface. These parameters will be specified for each layer. Define the half angle vector, a unit vector that bisects the angle between u and v:

$h(u,v) = (u+v)/\|u+v\|$.

Further, define $F(v,n) = 0.04 + 0.96*(1-(Dot(v,n))^5$ $Hexp(r) = 1/(r+0.0001)$, where Dot(x,y) represents the scalar dot product of vectors x and y.

Note that F(v,n) represents an approximation of the Fresnel reflection intensity due to incident light direction and Hexp(r) represents a mapping from the values zero to one (0 to 1) to zero to infinity (0 to infinity) which provides a conversion between the user input values (0 to 1) and a range that provides a more satisfactory visual appearance (the ability to obtain sharp highlights).

Given these definitions, $Diffuse(r,n,v,u) = (r+(1-r)(1F(v,n)))*C*Dot(n,u)$; and $Highlight(r,n,v,h) = (1-r)*F(v,n)*Dot(n,h)^{Hexp(r)}$ Note that other forms of these equations may also be used in practicing the invention, and that the given expressions for the Diffuse and Highlight components are chosen to provide a desired visual behavior and relative ease of computation. In the expression for the Diffuse component, C*Dot(n,u) represents the diffuse shape lobe attenuated by color, and Dot(n, h)^Hexp(r) represents the highlight lobe. Weighting the diffuse lobe is the expression (r+(1−r)(1−F(v,n))) and weighting the highlight lobe is the expression (1−r) F(v,n). Each expression is a function of both the roughness and the viewing direction, but the sum of the two expressions is unity (1). As viewing angle or roughness change, the relative weights of the two lobes (i.e., components) change, but the energy is distributed between the two lobes. The color term C is used to model absorption of the light by the surface.

Note that using these definitions, when r is relatively large the diffuse term dominates, and the very faint highlight is very broad. When r is relatively small, there is a stronger, sharper highlight. The highlight is weakest when Dot(v,n) is 1 (looking straight down at the surface) and strongest when Dot(v,n) is 0 (looking parallel to the surface).

In implementing the embodiment of the invention shown in FIG. 3, one approach is to first compute as much of the model as possible without introducing specific information about the location of the lighting sources. For the model being described, this means splitting each term into a weight and shape parameters. Note that the diffuse term has no shape parameters, and the highlight term has only one shape parameter, denoted by Hexp. For this model, the result obtained is:

$DiffWeight = (r+(1-r)(1-F(v,n)))*C$; and  (a)

$HighlightWeight = (1-r)*F(v,n)$, with the Highlight shape parameter, $Hexp$.  (b)

Note that the Hexp term takes on a non-linear set of values, and the resulting appearance isn't what would be termed visually linear with regards to changes in Hexp. As an example, visually, the difference between Hexp=1 and Hexp=10 is large compared to the difference between Hexp=1000 and Hexp=1010. To composite the Hexp terms, the inventor has determined that it is beneficial to convert the parameter to a different form. The inventor has found that in practice, it is desirable to solve for the Dot(n,h) value that would give a highlight shape strength of a specified value (say 0.1) for the given exponent.

Using this approach and the example value (0.1), gives:

$Dvh^{Hexp} = 0.1 => Dvh = 0.1^{(1/Hexp)}$;

Where to get Hexp, the expression Hexp=log(0.1)/log(dvh) is used.

This approach was adopted because it has been found that the distance at which the highlight shape falls below a fixed intensity is a good visual representation of the size of the highlight. Note that Dvh values can be blended (i.e., combined) to produce a good visual sense of highlights changing in size smoothly and uniformly. This is because the Dvh values are essentially an angle measure, so that combinations, interpolations, etc. provide visually plausible results (as opposed to combining exponent values which results in a bias towards the relatively large values that are used to represent shiny surfaces). As a result of the adopted model, the values produced from evaluating stage 304 for the reflection parameters are DiffWeight, HighlightWidth, and Dvh.

Note that in this embodiment, the inventive method will generate these three values for each layer that is to be combined in Stage 306. In addition, each layer may have a weight ($w_l$) that is used to describe how much of that layer is present at each point on the surface. The sum of all (w) values is 1 over the surface, so they represent a weighted average. The layer values may be combined as follows:

$$\text{DiffWeight} = \text{Sum(over } l \text{ layers)} \text{DiffWeight}_l * w_l; \text{ and}$$

$$\text{HighlightWeight} = \text{Sum(over } l \text{ layers)} \text{HighlightWeight}_l * w_l.$$

Note that if a weighted average was calculated for Dvh, a problem with regards to visual appearance may result. This is because when a very rough surface and a very smooth surface are blended together (e.g., dust over shiny plastic) a user desires to see less bright highlights, but not broader highlights in order to obtain a satisfactory visual appearance. Even though the HighlightWeight for the dust is 0, the Dvh value from the dust is large and will cause the resulting highlight to be broad when it is averaged together. A solution is to weight the shape parameters by the HighlightWeight for that layer as well, and then normalize the result, giving the following:

$$Dvh = \text{Sum(over } l \text{ layers)} \text{HighlightWeight}_l * w_l * Dvh_l / \text{Sum(over } l \text{ layers)} \text{HighlightWeight}_l * w_l.$$

Note that with this approach, if the HighlightWeight for a layer is very small, then that layer will have a minimal effect on the shape of the highlight.

At this point in the inventive method, the model is evaluated for each of the light sources. To do this, it is desirable to first derive the Hexp terms from the Dvh term(s). This process may be represented as:

colorResult=0
For each light, compute light intensity L and direction u $$h = (u+v)/\text{length}(u,v)$$

$$\text{DiffResult} = \text{DiffWeight} * \text{Dot}(n,u) * L$$

$$\text{HighlightResult} = \text{HighlightWeight} * \text{Dot}(v,h)^{Hexp} * L$$

$$\text{colorResult} = \text{colorResult} + \text{DiffuseResult} + \text{HighlightResult}$$

end for each

Note that the final color for a point on the surface is the term colorResult.

By comparison, if the same model (i.e., having a diffuse and a highlight term), were used with the method of FIG. 1, the method would have performed the compositing on C and r, to get newC and newR, and then evaluated the model for each light source using the resulting newC and newR. This process may be represented as:

colorResult=0
For each light, compute light intensity L and direction u $$h = (u+v)/\text{length}(u,v)$$

$$\text{DiffuseResult} = \text{Diffuse}(newC, newR, n, v, u) * L$$

$$\text{HighlightResult} = \text{HighlightWeight}(newR, n, v, h) * L$$

$$\text{colorResult} = \text{colorResult} + \text{DiffuseResult} + \text{HighlightResult}$$

end for each

Similarly, if the same model (i.e., having a diffuse and a highlight term), were used with the method of FIG. 2, the method would have evaluated each of the light sources for each set of $C_l$ and $r_l$ (as computed for each of the layers), and then weighted the result by the weight $w_l$ of the layer. The result would have been different from that obtained using the method of FIG. 3, primarily in terms of an increase in the computational resources required to evaluate the model. This process may be represented as:

colorResult=0
For each layer l
For each light, compute light intensity L and direction u $$h = (u+v)/\text{length}(u,v)$$

$$\text{DiffuseResult} = \text{Diffuse}(C_l, r_l, n, v, u) * L$$

$$\text{HighlightResult} = \text{HighlightWeight}(r_l, n, v, h) * L$$

$$\text{colorResult} = \text{colorResult} + w_l * (\text{DiffuseResult} + \text{HighlightResult})$$

end for each end

As mentioned, the model used in the previous discussion of an embodiment of the invention uses two components, Diffuse and Highlight. However, as noted, models having a greater number of components may also be used in practicing the invention. In one embodiment, the highlight term is split into 2 parts, a specular component (specular highlight) and a reflection component (reflection highlight). One benefit of this approach is that it provides a way of interacting with and controlling sharp highlights and broad highlights separately. It also provides for more robust combining of layers. This is because sharp highlights will only change the shape of other sharp highlights when blended, with the same behavior for broad highlights. As a result, this approach minimizes visual artifacts.

In addition, it is also desirable to be able to represent transparent/translucent surfaces (e.g., glass, thin plastic, leaves) as part of the image. This may be accomplished by introducing the corresponding components for transmitted light: diffuse transmission (transmitted diffuse), specular transmission (transmitted specular), and refraction. This gives a model having six components that match the visual components that users and artists typically use to specify the visual result they desire. Note that while it is possible to use fewer than six components, the range of surfaces that may be represented is reduced and the likelihood of visual artifacts from layering increases. It is also possible to use more than six components for the model, but the benefit obtained (if any) more rapidly decreases and the data storage and computation costs increase with each added component.

Using the six component model (i.e., a model having Diffuse, Specular Highlight, Reflection Highlight, Transmitted Diffuse, Transmitted Specular, and Refraction components), each component may be considered to have two parts. The first part is a distribution function and the parameters that control the function's shape. Ideally, the distribution function (or its cosine weighted values) should integrate to 1 over the hemisphere so that the default distribution function neither reflects more light than hits the surface nor less. In practice, it is generally satisfactory if this condition is approached or loosely met. The second part of each component is a weighting factor that determines how much energy goes into that component, i.e., that allocates the total energy among the various components. Note that there many types or classes of distributions that may be used in implementing the present invention. Typically, each distribution may have a slightly different set of assumptions, goals, or beneficial characteristics. For example, the assumptions underlying a distribution may be relevant to the underlying micro-facet structure of the surface and the aspects of physical light transport that are being modeled. Typical goals of using a specific distribution may include obtaining a visually pleasing result, ease of use in a Monte Carlo algorithm, or more easily being fit to measured data, for example. In this regard, as noted, the goals of the present invention include computational efficiency, obtaining a visually pleasing result with a minimal number of parameters, and an approximately normalized result.

Given a set of appearance parameters at a given point on the surface of a layer or object and the view direction at that point, the next stage in the inventive process or method is to determine the shape parameters (i.e., those parameters or values that define the distribution functions) for each of the six components of the model and the weights for each component (which determine the amount of energy allocated to each component). In some embodiments, the appearance parameters may be used to determine how energy is partitioned between each of the components and hence the weights for each component. In general, it is beneficial to users to utilize appearance parameters that closely correlate to how users think about the visual appearance of surfaces. This will vary based on a user's background and the set of surfaces that the model must address, but as an example, the following appearance parameters might be used:

Metallic—Is the material metallic?
Roughness—How rough is the material?
Transparency—How transparent is the material?
Scatter—If the material is transparent, is it clear like glass or translucent like wax?
Back—If the material is transparent does the light mostly scatter through to the other side, or back towards the light source?

As noted, other types or classes of appearance parameters may be used in embodiments of the present invention. Typically, appearance parameters are selected by an artist or designer because they represent characteristics of an object that are relevant to a user and are visually suggestive of the qualities of an object that the artist or designer desires to represent in a scene.

Empirically, each of the visual characteristics tends to partition the energy between different ones of the six model components, with the intended result being that for a given view direction, all the energy will be accounted for and distributed among the six components. The surface color may be used to further modify the components, by providing a wavelength dependent scaling factor for one or more terms. This has the effect of reducing the contribution of certain components to the overall result as a function of wavelength.

In some embodiments, for each of the six model components, two further conversion processes may be used: a first that takes the appearance parameters and the color and determines the weight or energy allocation for each of the model's components, and a second process that uses the appearance parameters to determine the shape of the distribution function of each component. In some embodiments, for the specular highlight, reflection highlight, transmitted specular, and refraction terms, the roughness parameter may be used to determine the shape of the distribution function for the component. In some implementations, the roughness parameter may be represented as the angle-based value at which the shape drops below a specified constant value—this assists in computations by permitting that value to be interpolated instead of being represented as an exponent that must be evaluated.

At this stage the inventive process has generated reflection parameters that can be interpolated and that describe how the surface or layer interacts with light for a given viewing angle. The results of performing the similar process for multiple layers can be combined based on the weights of the layers to produce a representation of how the appearance parameters for the multiple layers interact with light. After that, each light source can be evaluated with the reflection parameters being used to determine how much of the energy is reflected or scattered back to the viewer.

To summarize, in some embodiments, the total reflection process can be represented by six component functions: diffuse (Rd), diffuse transmission (Rdt), specular highlight (Rs), specular transmission, (Rst) reflection highlight (Rr), and refraction (Rrt). Each of these is a function of the parameters (Pd) that describe it, and the light direction (u) and viewing direction (v). Given this model, the total reflection may be represented by:

$$R(P(x,v),u,v)=Rd(Pd(x,v),u,v)+Rdt(Pdt(x,v),u,v)+Rs(Ps(x,v),u,v)+Rst(Pst(x,v),u,v)+Rr(Pr(x,v),u,v)+Rrt(Prt(x,v),u,v)$$

Further, each of the component functions has two aspects. First, is the shape of the function representing the component. For the specular and reflection components, the shape may be expressed as a normalized Gaussian function on the hemisphere, centered in the reflection direction. When using a Gaussian, the parameter that controls the variance of the function is used to visually control the sharpness of the highlight. The shape portion of the component can be thought of as a probability density function. Ideally, it integrates to unity (1) over the hemisphere and shows how a unit of energy is scattered over the hemisphere. The second part of the function representing a component of the reflection model is an overall weight applied to the shape or distribution. This may be represented as a color, as the weight of the specular and reflection terms may differ for red, green and blue (i.e., as a function of wavelength). The diffuse component may be represented as a blend between two or more shapes, distributions, or functions (where those shapes, distributions or functions may be selected because they better represent the visually desired behavior for that component when light reflects from a surface or layer). Further, color weights may be applied to determine the strength of each shape, distribution or function. If the weights on the components sum to less than 1 (or 1,1,1 if it is a color weighting based on the RGB scale), then energy is conserved. Note that since the model is designed to reproduce a desired visual appearance, strict energy conservation need not be imposed on the model.

As described with reference to FIG. 3, the reflection parameters (i.e., the shape and weight for each of the six components) for each layer are combined together to form a set of reflection parameters that characterize the structure or surface formed from the combination of layers. The weighting parameters (Wc) of each component are linear, and those weights may be summed based on the weight of the layer, which in some embodiments may be derived from a shading network. Here a shading network refers to a process for determining the presence of the layer at a point or location in space. For example, if there is dust on top of plastic, the shading network would determine where the dust layer is or is not present (i.e., a presence value of 1 or 0), with intermediate values representing partial dust coverage. Thus, by modulating the presence value, a user can give the appearance of more or less dust on the surface. As an example, a layer that has a presence value of 20% at a point or location means that 20% of the light hits that layer, and 80% of the light will pass through that layer and be available to the next layer down. If the next layer has a presence value of 50%, then 0.8*0.5=40% of the incident light will interact with that layer, and 40% will pass through to the next layer. By combining the presence values it is possible to get a weight for each layer (e.g., 0.2, 0.4, 0.4) for the three layers just described. The shape parameters (Sc) for the specular and reflection terms are blended/combined based on the normalized weighting parameters of the component (i.e., Sum (over 1) (Wc1*Sc1)/Sum(Wc)). This step has been found useful in generating a layered surface that looks visually plausible to users.

Note that in some cases, the shape parameters may need to be expressed in terms that result in a visually plausible result when using weighted blending. In this regard, it is desirable to blend the shape parameters in a visually linear space rather than simply blending arbitrary parameters. For example, a 50% blend of shape parameters for a very polished surface and a surface with a very broad highlight should have a highlight that is roughly half as broad. As an example, in an embodiment of the present invention that uses six terms or contributions to partition light scattered or reflected from a surface, the invention takes the incoming light and assign fractions of it to each of the six different scattering lobes based on the parameters the user manipulates. For a non-transparent surface, the principal parameter that may be used to partition the light is the surface roughness. In some embodiments, the roughness is used to control the relative weights of the reflection, specular, and diffuse components and the spread of the specular and reflection terms. A surface with roughness value zero (0) is perfectly smooth, has a strong reflection term, no specular, and a diffuse term determined by the Fresnel properties of the surface. As the roughness value increases, the reflection decreases and the diffuse increases. The specular term typically emerges quickly and is prominent for mid roughness values. At a roughness value of one (1) the surface is a completely diffuse scatterer. As the roughness value increases, the blurriness of the reflections and the width of the specular lobe increases as well. The behavior of the terms as the parameter varies are intuitive to a user and provide a visually satisfactory result for purposes of generating an image of a surface or surfaces.

Figure 4:
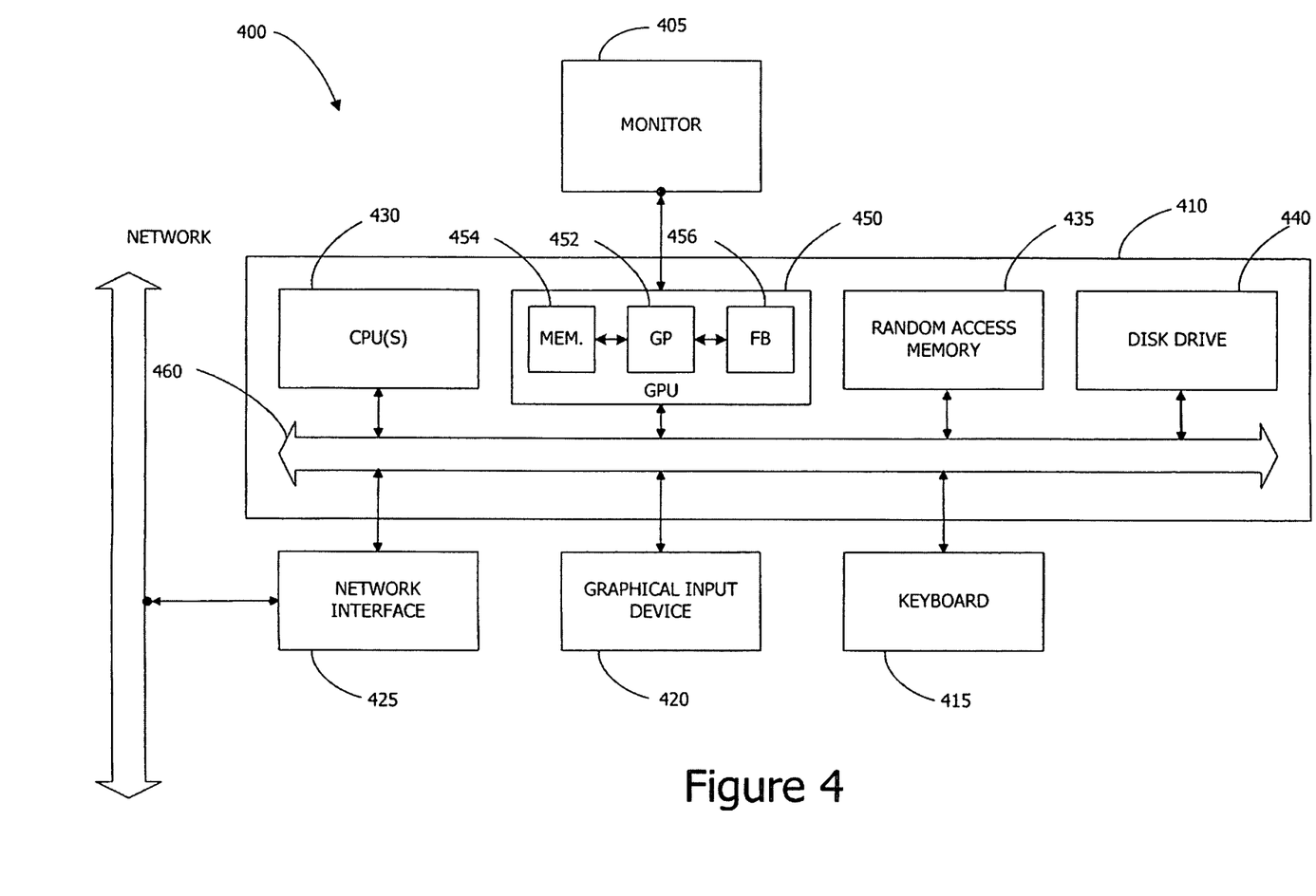
FIG. 4 is a block diagram of elements that may be present in a computing device or system configured to execute a method or process for modeling the reflection of light from a surface or structure comprised of multiple layers as part of rendering an image during production of an animated feature, in accordance with some embodiments of the present invention.

In some embodiments, the inventive system, apparatus, method, process or operation for rendering an image by modeling the reflection of light from a surface or structure comprised of multiple layers during the production of an animated feature may be wholly or partially implemented in the form of a set of instructions executed by a central processing unit (CPU) or microprocessor. As an example, FIG. 4 is a block diagram of a computer system that may be used to practice embodiments of the present invention. FIG. 4 is merely illustrative of an embodiment incorporating the present invention and does not limit the scope of the invention as recited in the claims. One of ordinary skill in the art would recognize other variations, modifications, and alternatives.

In one embodiment, computer system 400 typically includes a monitor 405, computer 410, a keyboard 415, a user input device 420, computer interfaces 425, and the like.

In various embodiments, user input device 420 is typically embodied as a computer mouse, a trackball, a track pad, a joystick, wireless remote, drawing tablet, voice command system, eye tracking system, and the like. User input device 420 typically allows a user to select objects, icons, text and the like that appear on the monitor 405 via a command such as a click of a button or the like.

Embodiments of computer interfaces 425 typically include an Ethernet card, a modem (telephone, satellite, cable, ISDN), (asynchronous) digital subscriber line (DSL) unit, FireWire interface, USB interface, and the like. For example, computer interfaces 425 may be coupled to a computer network, to a FireWire bus, or the like. In other embodiments, computer interfaces 425 may be physically integrated on the motherboard of computer 410, and may be a software program, such as soft DSL, or the like.

In various embodiments, computer 410 typically includes familiar computer components such as a processor 430, and memory storage devices, such as a random access memory (RAM) 435, disk drives 440, a GPU 450, and system bus 460 interconnecting the above components.

In some embodiment, computer 410 includes one or more Xeon microprocessors from Intel. Further, one embodiment, computer 410 includes a UNIX-based operating system.

RAM 435 and disk drive 440 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 450 may be any conventional graphics processing unit that may be user programmable. Such GPUs are available from NVIDIA, ATI, and other vendors. In this example, GPU 450 includes a graphics processor 452, a number of memories and/or registers 454, and a number of frame buffers 456.

FIG. 4 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of generating an image of a surface composed of a plurality of layers, comprising:
    determining a set of appearance parameters for each layer of the plurality of layers;
    converting each set of appearance parameters into a set of reflection parameters, thereby producing a set of reflection parameters for each of the plurality of layers;
    combining the set of reflection parameters for each of the plurality of layers to produce a set of reflection parameters for the surface, wherein combining is a weighted combining in that a layer's weight in the combination is determined by a highlight weight parameter for the layer and at least two layers can have different weights; and
    evaluating the set of reflection parameters for the surface for each of a plurality of light sources, thereby generating the image.

2. The method of claim 1, wherein the set of appearance parameters for each layer of the plurality of layers are selected from the group consisting of a color, a roughness, and a metallic parameter.

3. The method of claim 1, wherein converting each set of appearance parameters into a set of reflection parameters further comprises:
    for each of the plurality of layers,
    determining a representation for the reflected light from that layer, the representation having one or more components; and
    determining an expression for each component of the reflected light based on the appearance parameters for that layer.

4. The method of claim 3, wherein the representation for the reflected light includes a diffuse term and a highlight term.

5. The method of claim 4, wherein the highlight term is represented by a specular highlight term and a reflection highlight term.

6. The method of claim 3, wherein the representation for the reflected light includes a term or terms representing transmitted light.

7. The method of claim 6, wherein the teem or terms representing transmitted light includes a transmitted diffuse term, a transmitted specular term, and a refraction term.

8. An apparatus for generating an image of a surface composed of a plurality of layers, comprising:
    a processor configured to execute a set of instructions;
    a memory coupled to the processor for storing the set of instructions; and
    the set of instructions stored in the memory, wherein when executed by the processor the instructions implement a method to generate the image, comprising:
    a) instructions to determine a set of appearance parameters for each layer of the plurality of layers;
    b) instructions to convert each set of appearance parameters into a set of reflection parameters, thereby producing a set of reflection parameters for each of the plurality of layers;
    c) instructions to combine the set of reflection parameters for each of the plurality of layers to produce a set of reflection parameters for the surface, wherein combining is a weighted combining in that a layer's weight in the combination is determined by a highlight weight parameter for the layer and at least two layers can have different weights; and
    d) instructions to evaluate the set of reflection parameters for the surface for each of a plurality of light sources, thereby generating the image.

9. The apparatus of claim 8, wherein the set of appearance parameters for each layer of the plurality of layers are selected from the group consisting of a color, a roughness, and a metallic parameter.

10. The apparatus of claim 8, wherein converting each set of appearance parameters into a set of reflection parameters further comprises:
    for each of the plurality of layers,
    determining a representation for the reflected light from that layer, the representation having one or more components; and
    determining an expression for each component of the reflected light based on the appearance parameters for that layer.

11. The apparatus of claim 10, wherein the representation for the reflected light includes a diffuse term and a highlight term.

12. The apparatus of claim 11, wherein the highlight term is represented by a specular highlight term and a reflection highlight term.

13. The apparatus of claim 10, wherein the representation for the reflected light includes a term or terms representing transmitted light.

14. The apparatus of claim 13, wherein the term or terms representing transmitted light includes a transmitted diffuse term, a transmitted specular term, and a refraction term.

15. A computer program product, comprising a non-transitory computer readable medium encoded with a set of instructions, which when executed by a processor implement a method to generate an image of a surface composed of a plurality of layers, the method further comprising:
    determining a set of appearance parameters for each layer of the plurality of layers;
    converting each set of appearance parameters into a set of reflection parameters, thereby producing a set of reflection parameters for each of the plurality of layers;
    combining the set of reflection parameters for each of the plurality of layers to produce a set of reflection parameters for the surface, wherein combining is a weighted combining in that a layer's weight in the combination is determined by a highlight weight parameter for the layer and at least two layers can have different weights; and evaluating the set of reflection parameters for the surface for each of a plurality of light sources, thereby generating the image.

16. The computer program product of claim 15, wherein the set of appearance parameters for each layer of the plurality of layers are selected from the group consisting of a color, a roughness, and a metallic parameter.

17. The computer program product of claim 15, wherein converting each set of appearance parameters into a set of reflection parameters further comprises:

for each of the plurality of layers,
  determining a representation for the reflected light from that layer, the representation having one or more components; and
  determining an expression for each component of the reflected light based on the appearance parameters for that layer.

18. The computer program product of claim 17, wherein the representation for the reflected light includes a diffuse term and a highlight term.

19. The computer program product of claim 18, wherein the highlight term is represented by a specular highlight term and a reflection highlight term.

20. The computer program product of claim 17, wherein the representation for the reflected light includes a term or terms representing transmitted light.

21. The computer program product of claim 20, wherein the term or teams representing transmitted light includes a transmitted diffuse term, a transmitted specular term, and a refraction term.

* * * * *

UNITED STATES PATENT AND TRADEMARK OFFICE
CERTIFICATE OF CORRECTION

PATENT NO. : 8,269,772 B1  
APPLICATION NO. : 12/352506  
DATED : September 18, 2012  
INVENTOR(S) : Brian Smits Page 1 of 1

It is certified that error appears in the above-identified patent and that said Letters Patent is hereby corrected as shown below:

In the Claims:

Claim 7, Column 17, Line 65: delete "teem" and insert --term--

Claim 21, Column 20, Line 11: delete "teams" and insert --terms--

Signed and Sealed this  
Twenty-sixth Day of November, 2013

Margaret A. Focarino  
*Commissioner for Patents of the United States Patent and Trademark Office*